United States Patent
Lee et al.

(10) Patent No.: US 7,502,534 B2
(45) Date of Patent: Mar. 10, 2009

(54) RETRO-REFLECTIVE TYPE LIGHT PIPE, ILLUMINATION DEVICE INCLUDING THE SAME AND PROJECTION DISPLAY INCLUDING THE ILLUMINATION DEVICE

(75) Inventors: Young-chol Lee, Gunpo-si (KR); Kirill Sokolov, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/766,188

(22) Filed: Jun. 21, 2007

(65) Prior Publication Data

US 2008/0095511 A1 Apr. 24, 2008

(30) Foreign Application Priority Data

Oct. 19, 2006 (KR) .................. 10-2006-0102044

(51) Int. Cl.
*G02B 6/26* (2006.01)
*G02B 6/00* (2006.01)

(52) U.S. Cl. .................. 385/31; 385/36; 385/147; 385/901; 362/551; 362/560

(58) Field of Classification Search .................. 385/133, 385/31, 147, 125, 123, 129, 130, 36, 131, 385/14, 901, 900; 362/551, 560, 618, 620
See application file for complete search history.

(56) References Cited

U.S. PATENT DOCUMENTS

| | | | | |
|---|---|---|---|---|
| 4,569,569 A | | 2/1986 | Stewart | |
| 5,268,749 A | * | 12/1993 | Weber et al. | 356/446 |
| 5,835,661 A | * | 11/1998 | Tai et al. | 385/146 |
| 5,991,029 A | * | 11/1999 | Doyle | 356/451 |
| 6,337,946 B1 | * | 1/2002 | McGaffigan | 385/146 |
| 6,565,235 B2 | * | 5/2003 | Li | 362/304 |
| 2004/0174692 A1 | | 9/2004 | Bierhuizen | |
| 2004/0184287 A1 | | 9/2004 | Smith et al. | |

FOREIGN PATENT DOCUMENTS

| | | |
|---|---|---|
| CN | 2397509 Y | 9/2000 |
| CN | 1285047 A | 2/2001 |

* cited by examiner

*Primary Examiner*—Brian M Healy
(74) *Attorney, Agent, or Firm*—Sughrue Mion, PLLC (57) ABSTRACT

A retro-reflect type light pipe, an illumination device including the same, and a projection display including the illumination device are provided. The retro-reflective type light pipe includes an incident portion through which light is incident, a guide portion which guides the incident light such that the incident light propagates internally therewithin while being reflected at inner walls thereof, and which thereby mixes the incident light thus providing uniform light. A retro-reflective portion, provided at one end of the guide portion, re-reflects the incident light toward the incident portion. The illumination device includes a light source, the retro-reflective type light pipe, and an optical path-changing member provided between the light source and the retro-reflective type light pipe, which changes the direction of the light emitted from the light source such that the light from the light source propagates toward the retro-reflective type light pipe.

32 Claims, 8 Drawing Sheets

RETRO-REFLECTIVE TYPE LIGHT PIPE, ILLUMINATION DEVICE INCLUDING THE SAME AND PROJECTION DISPLAY INCLUDING THE ILLUMINATION DEVICE

CROSS-REFERENCE TO RELATED PATENT APPLICATIONS

This application claims priority from Korean Patent Application No. 10-2006-0102044 filed on Oct. 19, 2006, in the Korean Intellectual Property Office, the disclosure of which is incorporated herein in its entirety by reference.

BACKGROUND OF THE INVENTION

1. Field of the Invention

Apparatuses consistent with the present invention relate to an illumination device which can be miniaturized by providing uniform light with a relatively short light pipe, and a projection display including the same.

2. Description of the Related Art

In general, projection displays provide images by projecting the images produced from display devices on a screen using illumination devices. Display devices include digital micro-mirror devices (DMDs), transmissive liquid crystal display devices (LCDs), liquid crystal on silicon (LCOS), and so forth.

Illumination devices, which enable light incident from a light source to be illuminated with a uniform profile, are widely used for projection displays such as projectors and so on.

Figure 1:
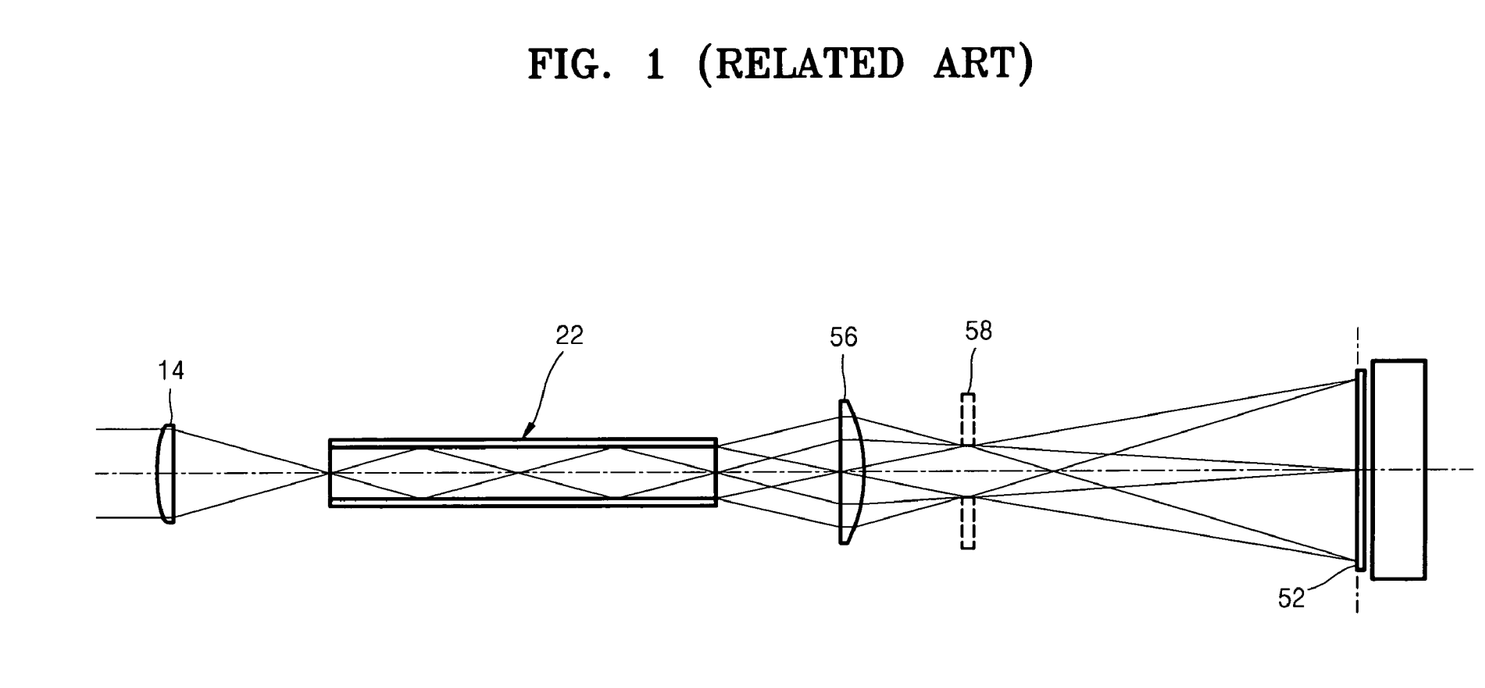
FIG. 1 is a schematic view illustrating an optical arrangement of a related art illumination device.

FIG. 1 is a schematic view illustrating an optical arrangement of a related art illumination device. Referring to FIG. 1, the related art illumination device includes a condenser lens 14 which condenses light incident from a light source, a light pipe 22 which mixes the light, and an illumination lens 56. The related art illumination device mixes the light incident from the light source using the light pipe 22 and thus provides uniform light. The uniform light formed at an output end of the light pipe 22 is projected onto an image display device 52 through the illumination lens 56. However, in the related art illumination device illustrated in FIG. 1, the light pipe 22 must have a predetermined length for providing the uniform light and a large space is required for arranging optical components, which makes it difficult to miniaturize the projection display. Furthermore, it is difficult to form uniform light when a plurality of light sources are used, each of which projects collimated light such as a laser beam.

SUMMARY OF THE INVENTION

Exemplary embodiments of the present invention provide a retro-reflective type light pipe capable of forming uniform light with a short optical path, an illumination device including the same, and a projection display including the illumination device, which can provide the uniform light easily and also can be miniaturized.

The present invention also provides a retro-reflective type light pipe including: an incident portion through which light is incident; a guide portion which guides the incident light such that the incident light propagates internally therewithin while being reflected at inner walls thereof, and which mixes the incident light thus providing uniform light; and a retro-reflective portion provided at an end of the guide portion, which re-reflects the incident light within the guide portion toward the incident portion.

According to an aspect of the present invention, there is provided an illumination device including: a light source; a retro-reflective type light pipe; and an optical path-changing member, disposed between the light source and the retro-reflective type light pipe, which changes an optical path of the light of the light source such that the light of the light source is directed toward the retro-reflective type light pipe.

According to another aspect of the present invention, there is provided a projection display including the illumination device, as discussed above; an image display device which selectively transmits and reflects light emitted from the illumination device to form an image; and a projection lens unit which projects the image formed by the image display device onto a screen.

BRIEF DESCRIPTION OF THE DRAWINGS

The above and other exemplary aspects and advantages of the present invention will become more apparent by the following detailed description of exemplary embodiments thereof with reference to the attached drawings in which.

DETAILED DESCRIPTION OF EXEMPLARY EMBODIMENTS OF THE INVENTION

A retro-reflect type light pipe, an illumination device including the same and a projection display including the illumination device will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, like reference numerals in the drawings may denote like elements, and the sizes of elements may be exaggerated for clarity.

Figure 2:
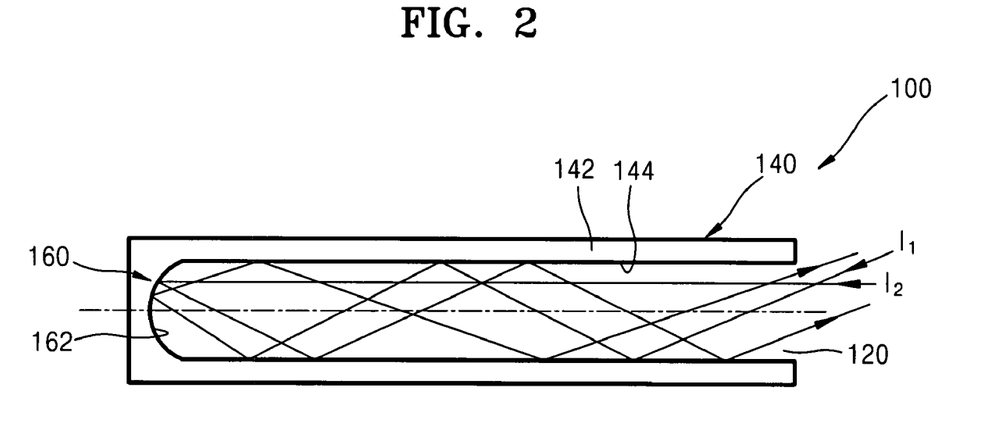
FIGS. 2 through 7 are schematic views of retro-reflective type light pipes according to various exemplary embodiments of the present invention.

FIG. 2 is a schematic view of a retro-reflective type light pipe 100 according to an embodiment of the present invention. The retro-reflective type light pipe 100 guides incident light thus providing uniform light by mixing the incident light, and thereafter emits the uniform light in an opposite direction to an incident direction of the incident light. To this end, the retro-reflective type light pipe 100 includes an incident portion 120 through which light is incident, a guide portion 140 which guides the incident light such that the light propagates internally while being reflected at the inner walls thereof, and a retro-reflective portion 160 emitting the incident light toward the incident portion 120 by changing the direction of its optical path. The retro-reflective portion 160 may be disposed opposite to the incident portion 120, and the guide portion 140, for example, may be configured with a barrel 142 comprising an inner space in which the light propagates and a reflective portion 144 formed on inner walls of the barrel 142. The retro-reflective portion 160 has a concave mirror surface 162 so that the incident light is retro-reflected toward the incident portion 120 and is then emitted through the incident portion 120. The concave mirror surface 162 may have a spherical shape or a parabolic shape, which may be appropriately selected in consideration of the desired optical path of the emitted light. A procedure whereby the incident light is mixed to provide uniform light and the uniform light is then emitted from the retro-reflective type light pipe 100 will be described below. Light I1 having a predetermined incident angle with respect to an optical axis, which is incident on the retro-reflective type light pipe 100, propagates inside the guide portion 140 while being reflected by the reflective portion 144. Thereafter, the incident light I1 is reflected by the retro-reflective portion 160 and then emitted toward the incident portion 120. Here, since the light reflected from the retro-reflective portion 160 propagates inside the guide portion 140 while being reflected by the reflective portion 144 again, the light is optically mixed so that uniform light is emitted. Light I2 incident in parallel with the optical axis is reflected by the retro-reflective portion 160. Afterward, the reflected light propagates toward the reflective portion 144 on the inner walls of the guide portion 140 and is reflected by the reflective portion 144 so that the light I2 incident in parallel with the optical axis is also emitted as uniform light. Because the light incident on the retro-reflective type light pipe 100 is emitted after reciprocating within the guide portion 140 by being reflected by the retro-reflective portion 160, the optical mixing can be effectively performed in a narrow space.

Figure 3:
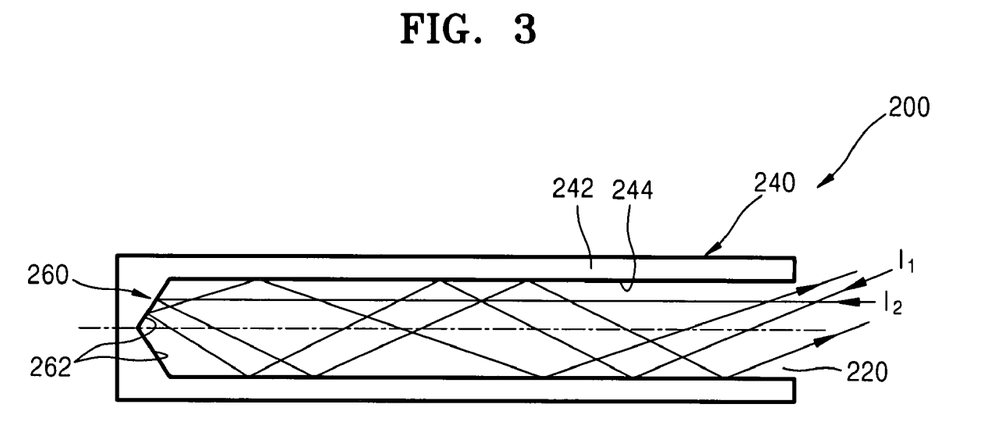
Figure 4:
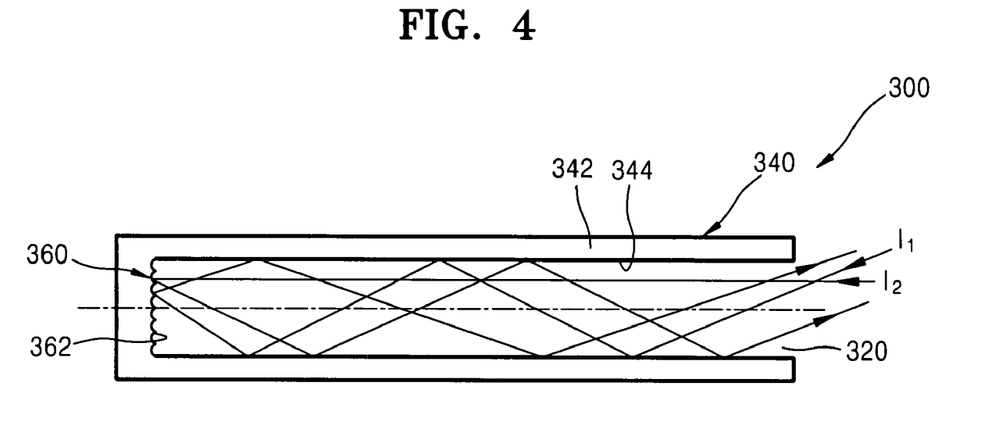

FIGS. 3 and 4 are schematic views of retro-reflective type light pipes 200 and 300 according to other embodiments of the present invention. Referring to FIGS. 3 and 4, the retro-reflective type light pipes 200 and 300 include incident portions 220 and 320, guide portions 240 and 340, including barrels 242 and 342 and reflective portions 244 and 344 respectively, and retro-reflective portions 260 and 360, respectively. Functions of the retro-reflective type light pipes 200 and 300 are substantially identical to that of the retro-reflective type light pipe 100 of FIG. 2 except for the detailed constructions of the retro-reflective portions 260 and 360. The retro-reflective portion 260 of FIG. 3 includes at least one flat mirror surface 262. The retro-reflective portion 260 may include a plurality of the flat mirror surfaces 262. For example, the flat mirror surfaces 262 may be disposed symmetrically to each other with respect to an optical axis. Although there are two flat mirror surfaces 262 illustrated in FIG. 3, the present invention is not limited thereto, and the number of the flat mirror surfaces 262 may be one or greater. The retro-reflective portion 360 of FIG. 4 includes a microprism array 362.

Figure 5:
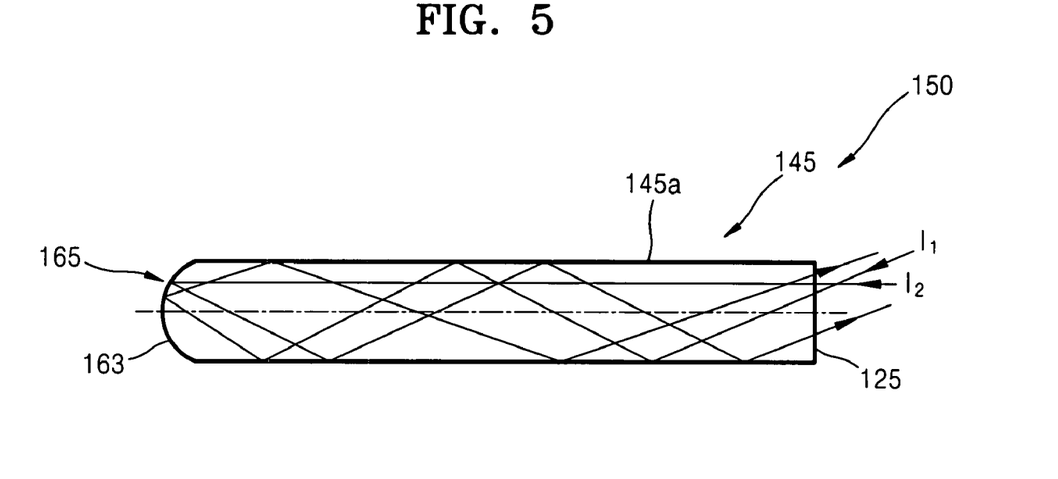

FIG. 5 is a schematic view of a retro-reflective type light pipe 150 according to another embodiment of the present invention. Referring to FIG. 5, the retro-reflective type light pipe 150 includes an incident portion 125 on which light is incident, a guide portion 145 including inner walls 145a, and a retro-reflective portion 165. The guide portion 145 guides the incident light such that the light propagates internally while being reflected at the inner walls thereof In particular, the guide portion 145 guides the light such that the light is totally reflected at the inner walls 145a by the refractive index difference between the guide portion 145 and the surroundings. Accordingly, the guide portion 145 is formed of a transparent medium having a refractive index greater than that of a surrounding medium, e.g., air. For example, the guide portion 145 may comprise a glass rod. When the light is incident on the inner walls 145a of the guide portion 145 at an angle greater than a critical angle ($\theta c$), the incident light is totally reflected. The retro-reflective portion 165 having a concave mirror surface 163 retro-reflects the incident light toward the incident portion 125 so that the reflected light is emitted through the incident portion 125. The concave mirror surface 163 has a spherical shape or a parabolic shape, which can be appropriately selected in consideration of a desired optical path of the emitted light. A procedure whereby the incident light is mixed to provide uniform light and the uniform light is then emitted from the retro-reflective type light pipe 150 will be described below. Light I1 having a predetermined incident angle with respect to an optical axis, which is incident on the retro-reflective type light pipe 150, propagates inside the guide portion 145 while being reflected by the inner walls 145a of the guide portion 145. Thereafter, the light is reflected by the retro-reflective portion 165 and then emitted toward the incident portion 125. Here, since the light reflected by the retro-reflective portion 165 propagates while being totally reflected by the inner walls 145a of the guide portion 145 again, the light is optically mixed so that uniform light is emitted. Light I2 which is incident in parallel with the optical axis is also reflected by the retro-reflective portion 165. Afterward, the reflected light propagates toward the inner walls 145a of the guide portion 145 and is then reflected again by the inner walls 145a so that the light I2 which was incident in parallel with the optical axis is also emitted as uniform light. Because light incident on the retro-reflective type light pipe 150 is emitted after it reciprocates within the guide portion 145 by being reflected by the retro-reflective portion 165, the optical mixing can be effectively performed in a narrow space.

Figure 6:
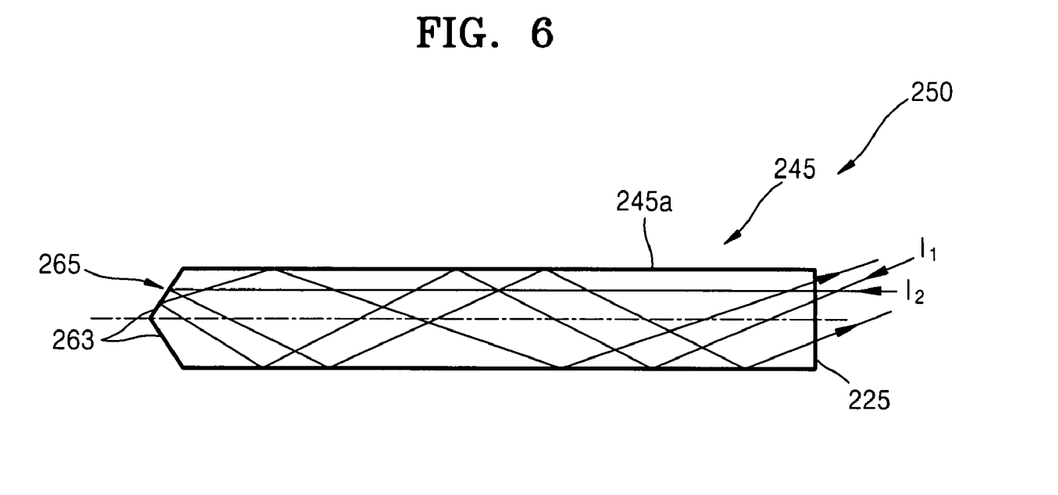
Figure 7:
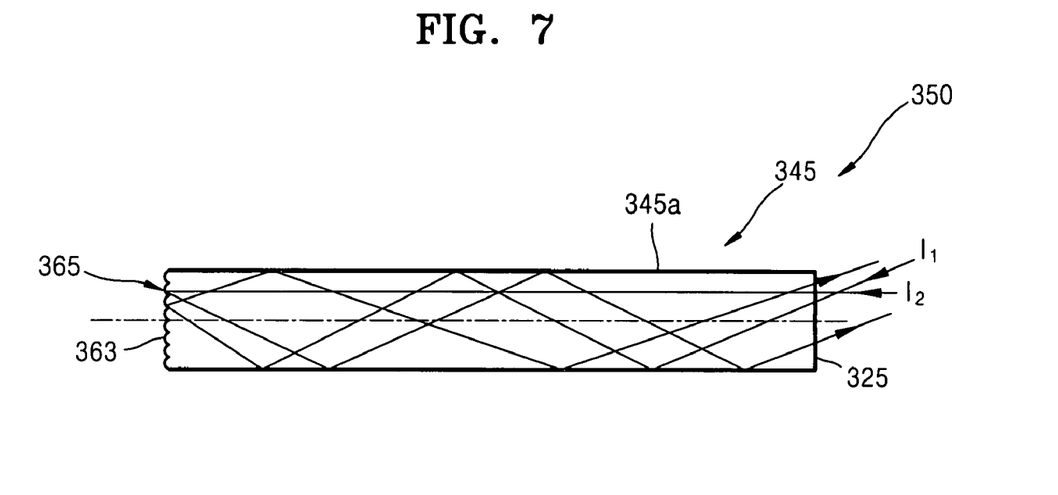

FIGS. 6 and 7 are schematic views of retro-reflective type light pipes 250 and 350 according to other embodiments of the present invention, respectively. Referring to FIGS. 6 and 7, the retro-reflective type light pipes 250 and 350 include incident portions 225 and 325, guide portions 245 and 345 including inner walls 245a and 345a respectively, and retro-reflective portions 265 and 365, respectively. Functions of the retro-reflective type light pipes 250 and 350 are substantially identical to that of the retro-reflective type light pipe 150 of FIG. 5 except for the detailed constructions of the retro-reflective portions 265 and 365. The retro-reflective portion 260 of FIG. 6 includes at least one flat mirror surface 263. The retro-reflective portion 265 may be configured with a plurality of the flat mirrors 263. For example, the flat mirror surfaces 263 may be disposed symmetrically to each other with respect to an optical axis. Although there are two flat mirror surfaces 263 illustrated in FIG. 6, the present invention is not limited thereto, and the number of the flat mirror surfaces 263 may be one or greater. The retro-reflective portion 365 of FIG. 7 includes a microprism array 363.

The present invention is not limited to the specific shapes of the retro-reflective type light pipes 100, 200, 300, 150, 250 and 350 illustrated in FIGS. 2 through 7. That is, the retro-reflective type light pipe according to the present invention may adopt every possible shape such that incident light can be reflected toward an incident portion from a retro-reflective portion and the reflected light can be emitted through such an optical path after optical mixing. For instance, a guide portion of the retro-reflective type light pipe according to the present invention may have a curved shape as well as a straight-line shape.

Figure 8:
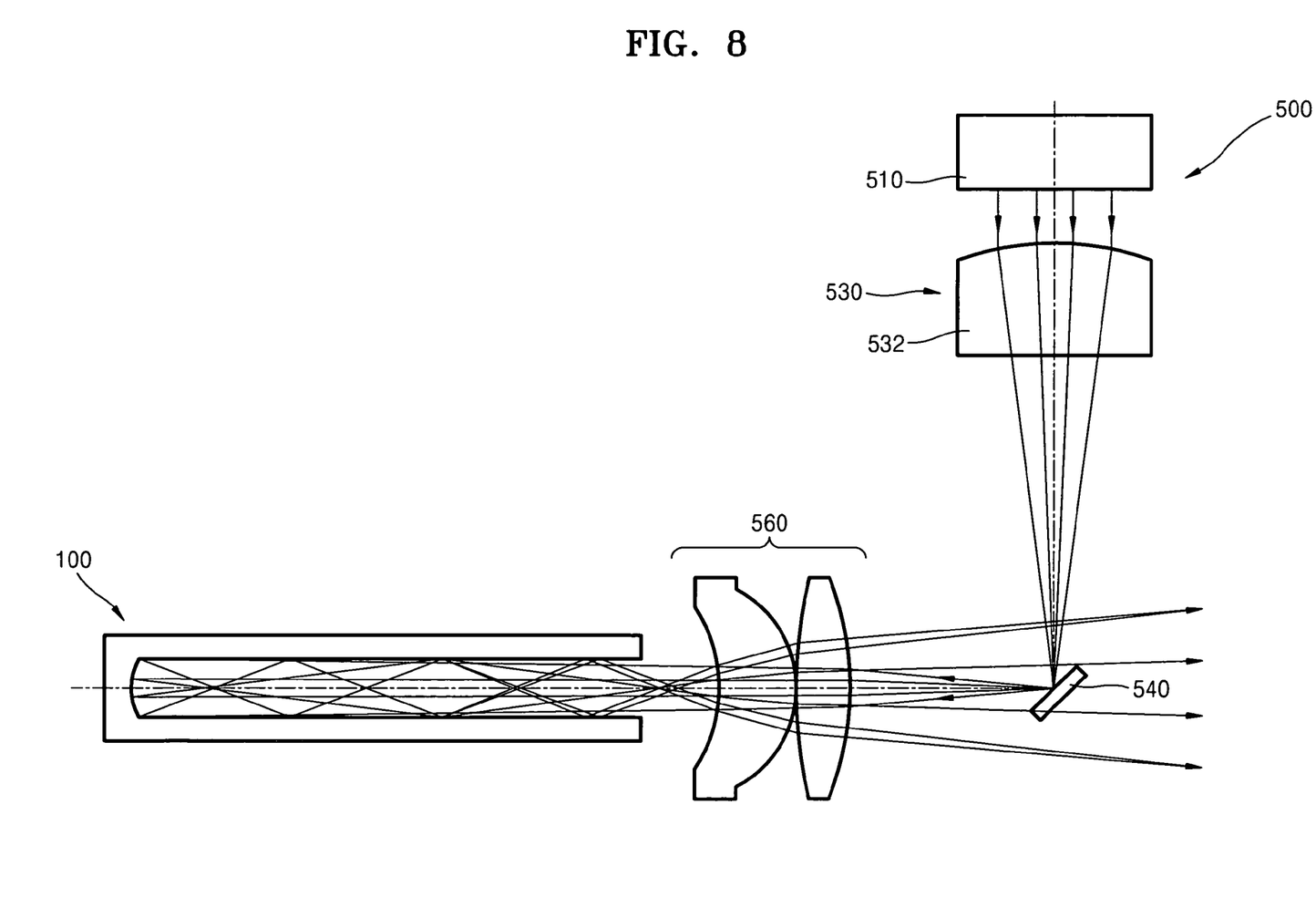
FIG. 8 is a schematic view of an illumination device according to an exemplary embodiment of the present invention.

FIG. 8 is a schematic view of an illumination device 500 according to an embodiment of the present invention. Referring to FIG. 8, the illumination device 500 includes a light source 510, the retro-reflective type light pipe 100 of FIG. 2 and an optical path-changing member 540.

A light emitting diode (LED), a laser, or the like, may be used as the light source 510. The retro-reflective type light pipe 100 guides the incident light thus forming uniform light by mixing the incident light and then emits the uniform light in an opposite direction to the incident direction of the incident light by changing its optical path.

The constitution and the function of the retro-reflective type light pipe 100 are substantially identical to those illustrated in FIGS. 2 through 7. In addition, although the retro-reflective type light pipe 100 of FIG. 2 is illustrated in FIG. 8, any one of the retro-reflective type light pipes 200, 300, 150, 250 and 350 illustrated in FIGS. 3 through 7 may also be used in the illumination device 500 according to the current embodiment of the present invention.

The optical path changing member 540 is disposed between the light source 510 and the retro-reflective type light pipe 100, and changes the optical path such that the light incident from the light source 510 propagates toward the retro-reflective type light pipe 100. For example, the optical path changing member 540 may comprise a mirror. The optical path-changing member 540 may be sized such that it can avoid the optical path of the uniform light emitted from the retro-reflective type light pipe 1 00. The illumination device 500 additionally includes an illumination lens unit 560 between the optical path-changing member 540 and the retro-reflective type light pipe 100 for converging the light incident from the light source 510 to correspond to the incident portion 120 of FIG. 2 of the retro-reflective type light pipe 100. The shape of the illumination lens unit 560 is not limited to that illustrated in FIG. 8. However, the illumination lens unit 560 may comprise a plurality of lenses or a single lens. Meanwhile, the optical path-changing member 540 may be disposed at a focal point of the illumination lens unit 560. In addition, the illumination device 500 may further include a condenser unit 530 for condensing the light incident from the light source 510 toward the focal point of the illumination lens unit 560, that is, at the optical path-changing member 540. The condenser unit 530 may employ a condenser lens 532 for condensing the light.

Figure 9:
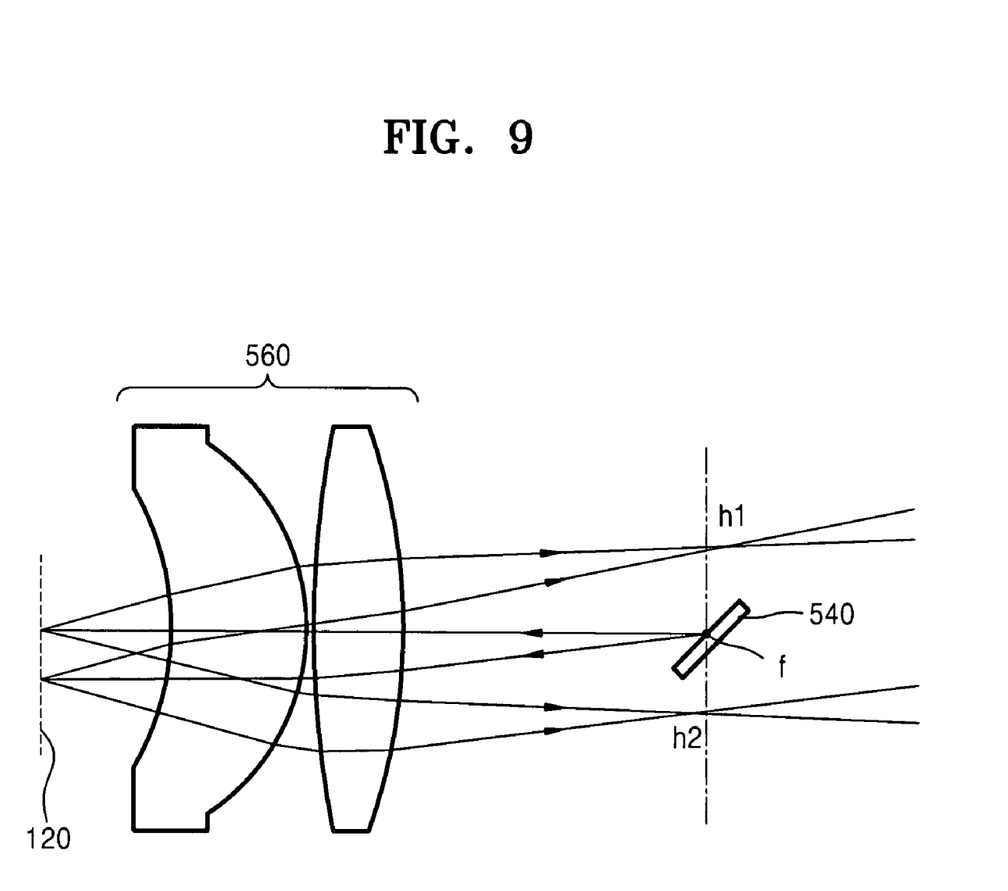
FIG. 9 is a schematic view illustrating an optical path near a focal point of an illumination lens unit, according to an exemplary embodiment of the present invention.

FIG. 9 is a schematic view illustrating an optical path near the focal point of the illumination lens unit 560, according to an embodiment of the present invention. A procedure whereby the illumination device 500 emits the uniform light will be described with reference to FIGS. 8 and 9. The light irradiated from the light source 510 is condensed toward the focal point of the illumination lens unit 560 by the condenser unit 530. Meanwhile, the optical path-changing member 540 is disposed at the focal point of the illumination lens unit 560 and changes the optical path of the condensed light to be directed toward the illumination lens unit 560. The light directed toward the illumination lens unit 560 is converted into parallel light after passing through the illumination lens unit 560, and thereafter is incident on the incident portion 120 of the retro-reflective type light pipe 100. Since the retro-reflective type light pipe 100 includes the retro-reflective portion 160 of FIG. 2 as described above, the light is reflected by the retro-reflective portion 160 and optically mixed thereby providing uniform light at the guide portion 140 of FIG. 2. Thus, uniform light is emitted through the incident portion 120 again. Here, the incident light is parallel with the retro-reflective type light pipe 100 but the emitted uniform light has a predetermined angle with respect to the optical axis of the retro-reflective type light pipe 100 different from that of the incident light. Thus, the emitted uniform light does not pass through a focal point f of the illumination lens unit 560 but passes through a point h1 or h2 spaced apart from the focal point f of the illumination lens unit 560 after passing through the illumination lens unit 560. That is, the uniform light propagates such that it avoids the optical path-changing member 540.

Figure 10:
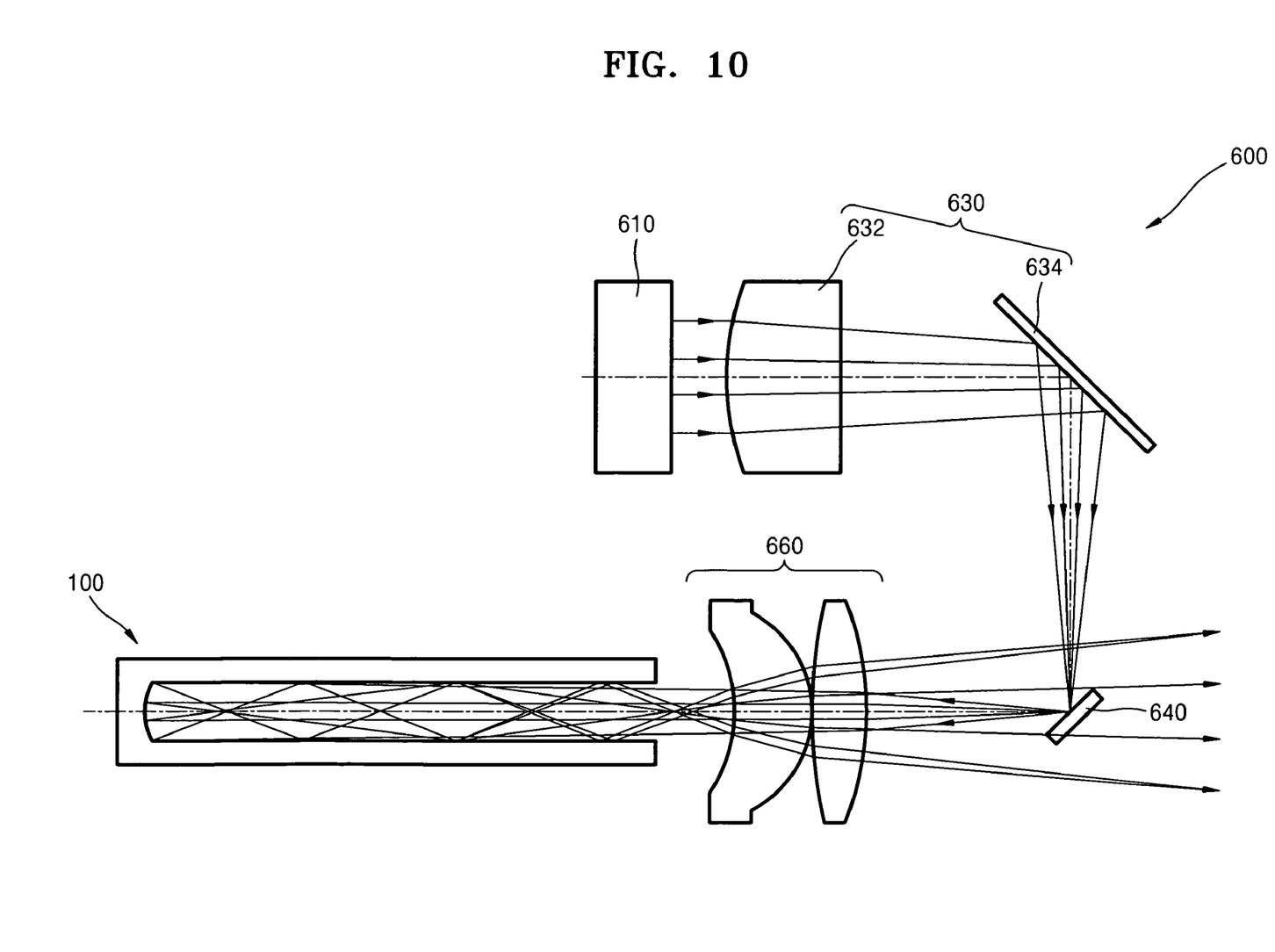
FIG. 10 is a schematic view of an illumination device according to another exemplary embodiment of the present invention.

FIG. 10 is a schematic view of an illumination device 600 according to another embodiment of the present invention. Referring to FIG. 10, the illumination device 600 includes a light source 610, the retro-reflective type light pipe 100 of FIG. 2, and an optical path-changing member 640. Although the retro-reflective type light pipe 100 of FIG. 2 is illustrated in FIG. 10, any one of the retro-reflective type light pipes 200, 300, 150, 250 and 350 illustrated in FIGS. 3 through 7 may be used in the illumination device 600 according to the current embodiment of the present invention.

The illumination device 600 may further include an illumination lens unit 660 between the optical-path changing member 640 and the retro-reflective type light pipe 100, for converging the light incident from the light source 610 to correspond to the incident portion of the light pipe 100. In this case, the optical path changing member 640 may be disposed at a focal point of the illumination lens unit 660. The illumination device 600 may further include a condenser unit 630 for condensing the light incident from the light source 610 toward the focal point of the illumination lens unit 660. Functions of the above elements are substantially identical to those of similar elements of the illumination device 500 as illustrated in FIGS. 8 and 9. However, the direction in which the light is irradiated from the light source 610 of the illumination device 600 of FIG. 10 is different from the direction in which the light is irradiated from the light source 510 of the illumination device 500 of FIG. 8. That is, the light is radiated from the light source 610 in parallel with the optical axis of the retro-reflective type light pipe 100. The condenser unit 630, which plays a role in condensing the light of the light source 610 into the focal point of the illumination lens unit 660, includes a condenser lens 632 for condensing light and a reflective member 634 for changing an optical path so that the light propagates toward the optical path-changing member 640. The reflective member 634, for example, may include a mirror.

Figure 11:
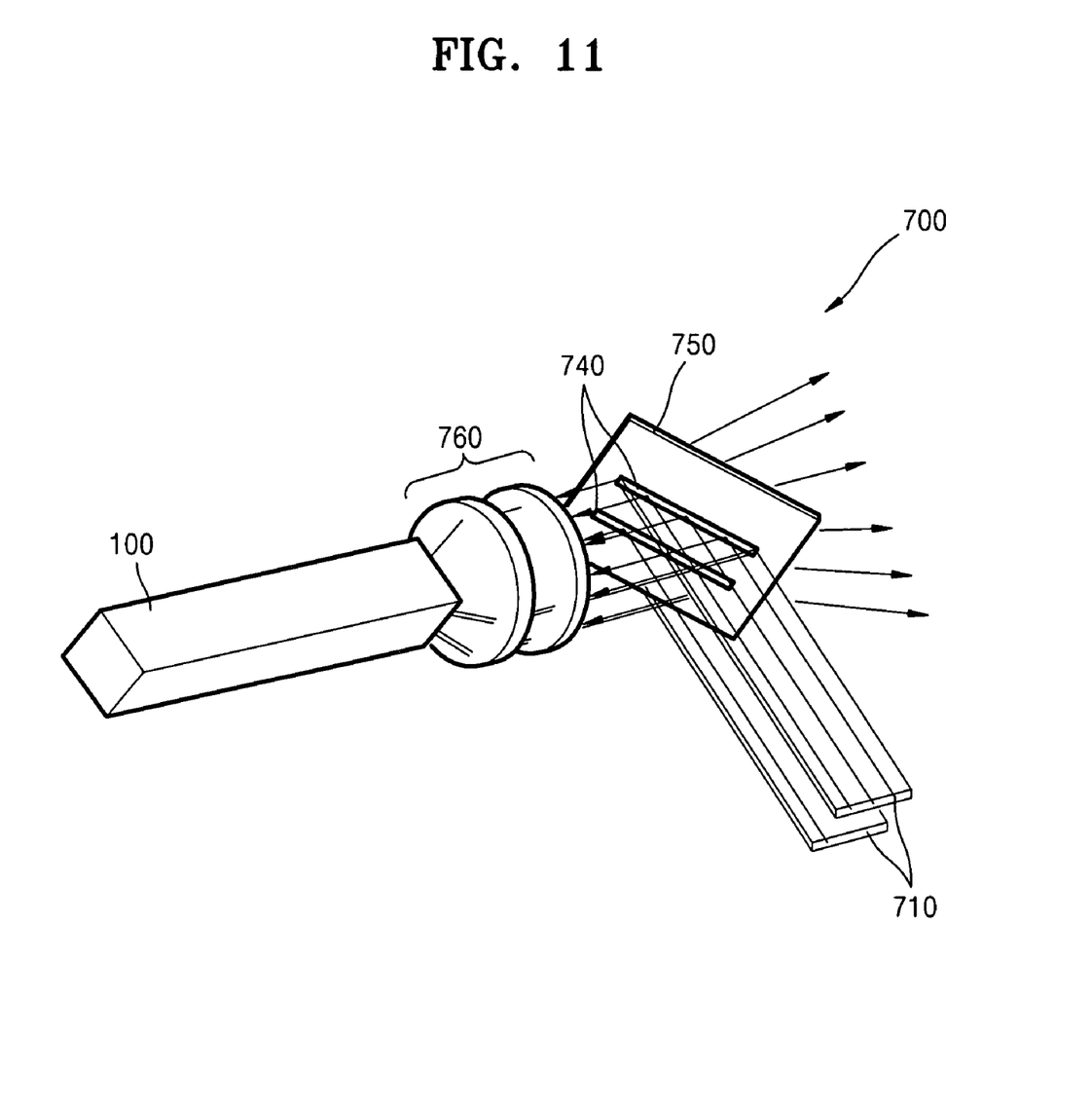
FIG. 11 is a schematic perspective view of an illumination device according to another exemplary embodiment of the present invention.

FIG. 11 is a schematic perspective view of an illumination device 700 according to another embodiment of the present invention. In the illumination device 700, an optical path-changing member 740 is disposed at a position similar to the position hi or h2 of FIG. 9. The illumination device 700 includes a light source 710, the retro-reflective type light pipe 100 of FIG. 2 and an optical path-changing member 740. Although the retro-reflective type light pipe 100 of FIG. 2 is illustrated in FIG. 11, the present invention is not limited thereto, and any one of the retro-reflective type light pipes 200, 300, 150, 250 and 350 illustrated in FIGS. 3 through 7 may be used in the illumination device 700 according to the current embodiment of the present invention.

The illumination device 700 may further include an illumination lens unit 760 disposed along an optical path between the light source 710 and the retro-reflective type light pipe 100. Functions of the above elements are substantially identical to those of similar elements of the illumination devices 500 and 600 as illustrated in FIGS. 8 and 10, except that the optical path-changing member 740 is disposed at a position spaced apart from the focal point of the illumination lens unit 760, e.g., the point h1 or h2. The optical path-changing member 740, for example, may include a mirror. As illustrated in FIG. 11, the optical path-changing member 740 may be provided in the shape of a mirror surface 740 coated on an optical transmissive member 750. In addition, although there are two optical path-changing members 740 illustrated in FIG. 11, the present invention is not limited thereto, and the number of the optical path-changing members 740 may be one or greater corresponding to the number of the light sources 710. The optical path changing member has approximately the same size as a cross-sectional area of light beams emitted by the light source 710. The light of the light source 710 is directed toward the illumination lens unit 760 by the optical path-changing member 740, and then is incident on the retro-reflective type light pipe 100 via the illumination lens unit 760. The procedure whereby the light is emitted after optical mixing via the retro-reflective type light pipe 100 is substantially identical to that described with reference to FIGS. 2 through 7. Meanwhile, the emitted uniform light propagates along the optical path not interfering with the optical path-changing member 740 via the illumination lens unit 760 so that uniform light is emitted.

Figure 12:
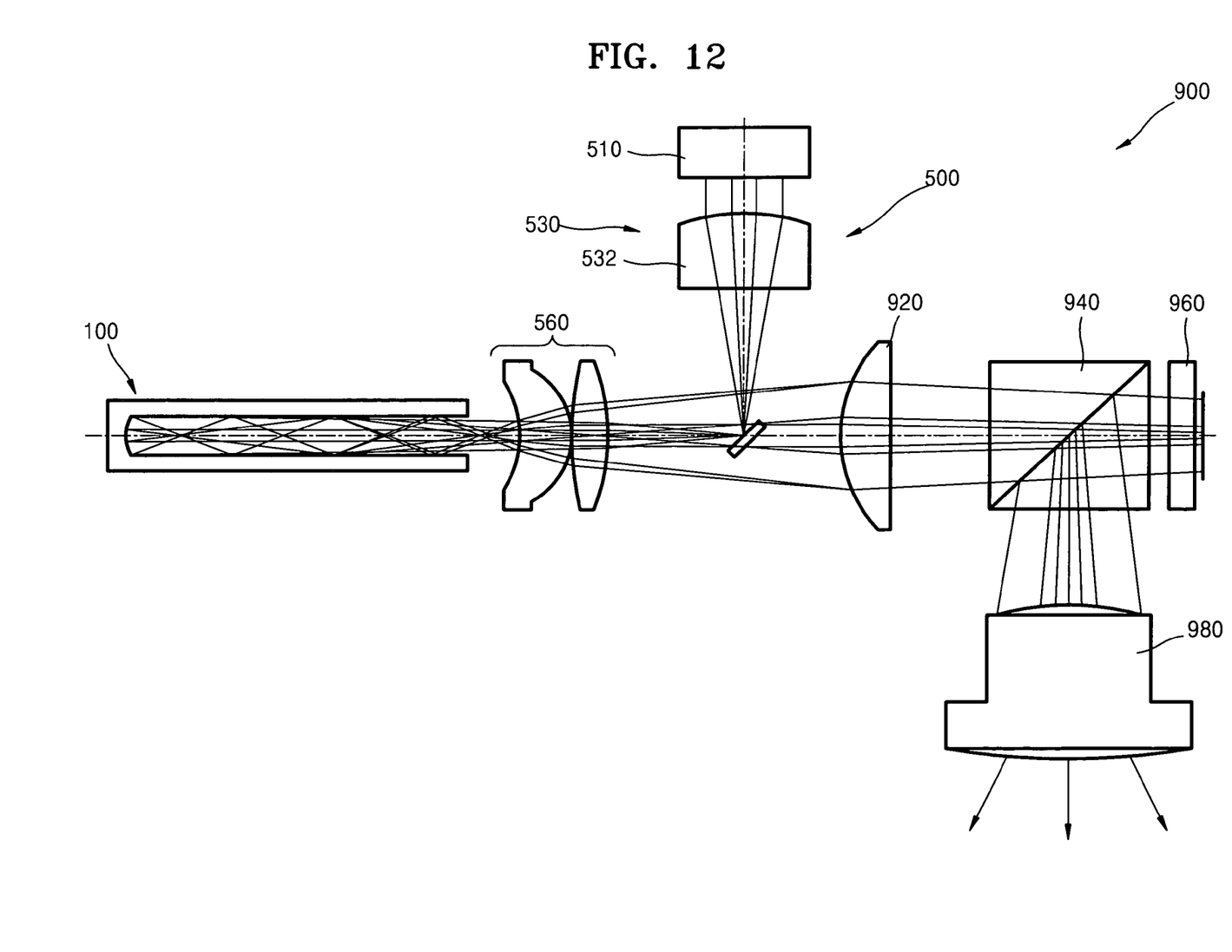
FIG. 12 is a schematic view of a projection display according to an exemplary embodiment of the present invention.

FIG. 12 is a schematic view of a projection display 900 according to an embodiment of the present invention. Referring to FIG. 12, the projection display 900 includes the illumination device 500 of FIG. 8, an image display device 960, and a projection lens unit 980. Although the illumination device 500 of FIG. 8 is illustrated in FIG. 12, the present invention is not limited thereto, and any of the illumination devices 600 and 700 of FIGS. 10 and 11 may be used in the projection display 900. Between the image display device 960 and the illumination device 500, the projection display 900 may further include a relay lens 920 converging the light to correspond to the image display device 960. In addition, a beam splitter 940 may be additionally provided between the image display device 960 and the relay lens 920. The beam splitter 940, for example, may be a polarization beam splitter reflecting or transmitting the light according to its polarization. The image display device 960 may form an image by selectively transmitting or reflecting the uniform light emitted from the illumination device 500. The image display device 960 illustrated in FIG. 12 is a reflective display device such as a liquid crystal on silicon (LCOS), but the present invention is not limited thereto, and may also be a digital micro-mirror device in which the image is formed by selectively reflecting the incident light in units of pixels or a transmissive display device such as a transmissive liquid crystal display device in which the image is formed by selectively transmitting the incident light in units of pixels. The projection lens unit 980 enlarges and projects the image formed by the image display device 960 on a screen (not shown).

The retro-reflective type light pipe according to the present invention is configured such that incident light propagates in the guide portion while being reflected by the inner walls of the guide portion so that the incident light is optically mixed, and further has a retro-reflective portion which re-reflects the incident light toward the incident portion. Therefore, in the retro-reflective type light pipe according to the present invention, it is possible to effectively mix light in a narrow space. In addition, it is possible to miniaturize an illumination device including the retro-reflective type light pipe, and a projection display including the illumination device.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A retro-reflective type light pipe comprising:
   an incident portion through which light is incident;
   a guide portion which guides the incident light, such that the incident light propagates internally therewithin while being totally internally reflected at inner walls thereof, and which thereby mixes the incident light thus providing uniform light; and
   a retro-reflective portion, provided at an end of the guide portion, which re-reflects the incident light within the guide portion toward the incident portion,
   wherein substantially all of the incident light is emitted through the incident portion.

2. The retro-reflective type light pipe of claim 1, wherein the guide portion comprises:
   a cylindrical member comprising an inner space in which the incident light propagates; and
   a reflective portion formed on inner walls of the cylindrical member.

3. The retro-reflective type light pipe of claim 1, wherein a refractive index of the guide portion is greater than a refractive index of a surrounding medium, such that the incident light is totally internally reflected within the guide portion.

4. The retro-reflective type light pipe of claim 1, wherein the retro-reflective portion is disposed at a first end of the light pipe, and the incident portion is disposed at a second end of the light pipe, opposite the first end.

5. The retro-reflective type light pipe of claim 1, wherein the retro-reflective portion comprises a concave mirror.

6. The retro-reflective type light pipe of claim 1, wherein the retro-reflective portion comprises a flat mirror inclined with respect to a plane perpendicular to a central axis of the guide portion.

7. The retro-reflective type light pipe of claim 6, wherein the retro-reflective portion comprises a plurality of flat mirrors arranged symmetrically with respect to the central axis of the guide portion.

8. The retro-reflective type light pipe of claim 1, wherein the retro-reflective portion comprises a microprism array.

9. An illumination device comprising:
   a light source;
   a retro-reflective type light pipe which guides incident light from the light source in a first direction and mixes the incident light by total internal reflection, thereby providing uniform light, and emits the uniform light in a second direction opposite the first direction; and
   an optical path-changing member disposed between the light source and the retro-reflective type light pipe, which changes an optical path of the incident light from the light source such that the light from the light source is directed toward the retro-reflective type light pipe;
   wherein the retro-reflective light pipe receives all of the incident light at an incident portion and the emitted uniform light including substantially all of the incident light is emitted through the incident portion.

10. The illumination device of claim 9, wherein the retro-reflective type light pipe comprises:
    an incident portion through which light is incident;
    a guide portion which guides the incident light, such that the incident light propagates internally therewithin while being reflected at inner walls thereof, and which thereby mixes the incident light thus providing the uniform light; and a retro-reflective portion, provided at an end of the guide portion, which re-reflects the incident light in the second direction toward the incident portion.

11. The illumination device of claim 10, wherein the guide portion comprises:
    a cylindrical member comprising an inner space in which the incident light propagates; and
    a reflective portion formed on inner walls of the cylindrical member.

12. The illumination device of claim 10, wherein a refractive index of the guide portion is greater than a refractive index of a surrounding medium, such that the incident light is totally internally reflected within the guide portion.

13. The illumination device of claim 10, wherein the retro-reflective portion is disposed at a first end of the light pipe and the incident portion is disposed at a second end of the light pipe, opposite the first end.

14. The illumination device of claim 10, wherein the retro-reflective portion comprises a concave mirror.

15. The illumination device of claim 10, wherein the retro-reflective portion comprises a flat mirror inclined with respect to a plane perpendicular to a central axis of the guide portion.

16. The illumination device of claim 15, wherein the retro-reflective portion comprises a plurality of flat mirrors arranged symmetrically with respect to the central axis of the guide portion.

17. The illumination device of claim 10, wherein the retro-reflective portion comprises a microprism array.

18. The illumination device of claim 9, further comprising an illumination lens unit disposed along an optical path between the optical path-changing member and the retro-reflective type light pipe, wherein the illumination lens unit focuses light incident thereon, onto the incident portion of the retro-reflective type light pipe.

19. The illumination device of claim 18, wherein the optical path-changing member is disposed at a focal point of the illumination lens unit.

20. The illumination device of claim 19, further comprising a condenser unit which focuses light incident thereon from the light source on the focal point of the illumination unit.

21. The illumination device of claim 20, wherein the optical path-changing member is positioned and has a size such that the optical path-changing unit is not within an optical path of light emitted from the illumination lens unit with a predetermined angle with respect to an optical axis of the retro-reflective type light pipe.

22. The illumination device of claim 18, wherein the optical path-changing member is spaced apart from a focal point of the illumination lens unit.

23. The illumination device of claim 22, wherein the optical path-changing member has approximately the same size as a cross-sectional area of light beams emitted by the light source.

24. The illumination device of claim 23, wherein the optical path-changing member is positioned and has a size such that it is not within the optical path of light emitted from the illumination lens unit.

25. A projection display comprising:
    the illumination device of claim 9;
    an image display device which selectively transmits and reflects light emitted from the illumination device to form an image; and
    projection lens unit which projects the image formed by the image display device onto a screen.

26. The projection display of claim 25, further comprising an illumination lens unit disposed along an optical path between the optical path-changing member and the retro-reflective type light pipe, wherein the illumination lens unit focuses light incident thereon onto the incident portion of the retro-reflective type light pipe.

27. The projection display of claim 26, wherein the optical path-changing member is disposed at a focal point of the illumination lens unit.

28. The projection display of claim 27, further comprising a condenser unit which focuses light from the light source onto the focal point of the illumination lens unit.

29. The projection display of claim 28, wherein the optical path-changing member is disposed and has a size such that it is not within the optical path of light emitted from the illumination lens unit with a predetermined angle with respect to the optical axis of the of the retro-reflective type light pipe.

30. The projection display of claim 26, wherein the optical path-changing member is spaced apart from a focal point of the illumination lens unit.

31. The projection display of claim 30, wherein the optical path-changing member has approximately the same size as a cross-sectional area of light beams emitted by the light source.

32. The projection display of claim 31, wherein the optical path-changing member is disposed and has a size such that it is not within the optical path of light emitted from the illumination lens unit.

* * * * *